(12) United States Patent
Yu et al.

(10) Patent No.: US 9,653,959 B2
(45) Date of Patent: May 16, 2017

(54) ROTOR DEVICE OF INTEGRATED STATER-GENERATOR MOTOR AND ROTOR WORKING SYSTEM

(75) Inventors: Ping Yu, Beijing (CN); Zhenjun Zhang, Beijing (CN); Wei Cai, Beijing (CN)

(73) Assignee: Jing-Jin Electric Technologies Co., Ltd., Beijing (CN)

( * ) Notice: Subject to any disclaimer, the term of this patent is extended or adjusted under 35 U.S.C. 154(b) by 476 days.

(21) Appl. No.: 13/822,488

(22) PCT Filed: Nov. 16, 2010

(86) PCT No.: PCT/CN2010/001840
§ 371 (c)(1),
(2), (4) Date: Apr. 15, 2013

(87) PCT Pub. No.: WO2012/034259
PCT Pub. Date: Mar. 22, 2012

(65) Prior Publication Data
US 2013/0193687 A1    Aug. 1, 2013

(30) Foreign Application Priority Data
Sep. 13, 2010 (CN) .......................... 2010 1 0279458

(51) Int. Cl.
*B60K 6/26* (2007.10)
*H02K 5/06* (2006.01)
(Continued)

(52) U.S. Cl.
CPC ................. *H02K 5/04* (2013.01); *B60K 6/26* (2013.01); *H02K 5/06* (2013.01); *H02K 7/006* (2013.01);
(Continued)

(58) Field of Classification Search
CPC ............ H02K 5/00; H02K 1/27; H02K 21/22; H02K 7/00; H02K 7/02; H02K 7/09;
(Continued)

(56) References Cited

U.S. PATENT DOCUMENTS 3,635,320 A * 1/1972 Capanna ................... 192/107 M
3,696,689 A * 10/1972 Senter et al. ................... 74/609
(Continued)

FOREIGN PATENT DOCUMENTS

CN        2886907 Y      4/2007
CN     101075770 A      11/2007
(Continued)

*Primary Examiner* — Burton Mullins
(74) *Attorney, Agent, or Firm* — Boyle Fredrickson, S.C.

(57) ABSTRACT

A rotor device of an integrated starter-generator motor and a rotor working system are disclosed in the present invention. The rotor device is a monobloc cast, that is machined, to form an inseparable one-piece structure. The rotor device takes the shape of a straw hat and is provided with an external side surface of a hat top being surface (11), an external side surface of a hat brim being surface (13), an inner side surface of the hat brim being surface (12) and a surface (14) which connects the surface (11) with the surface (13). The surface (11) of the rotor device is provided with multiple through holes (1) used for fixing with a crankshaft (82). The surface (12) of the rotor device is provided with multiple threaded holes (2) used for connecting with a clutch. The threaded holes (2) pass through the surface (13) corresponding to the surface (12).

6 Claims, 4 Drawing Sheets

(51) Int. Cl.
*H02K 5/04* (2006.01)
*H02K 23/52* (2006.01)
*H02K 7/00* (2006.01)
*B60K 6/48* (2007.10)

(52) U.S. Cl.
CPC ...... *H02K 23/52* (2013.01); *B60K 2006/4825* (2013.01); *H02K 7/003* (2013.01)

(58) Field of Classification Search
CPC   H02K 7/10; H02K 7/18; H02K 7/025; H02K 7/25; H02K 26/00; H02K 53/00; H02K 7/108; H02K 7/11; H02K 7/112; H02K 17/32; H02K 27/30; H02K 23/68; H02K 7/114; H02K 5/04; H02K 5/06; H02K 7/003; H02K 7/006; H02K 23/52; F16D 13/644; F16D 2250/0007; F16D 2250/0013; B60K 6/26; B60K 2006/268
USPC .... 310/40 R, 74, 75 R, 87, 88, 89, 90.5, 91, 310/92, 96, 103, 109 R, 113, 153, 261.1, 310/268; 3/40 R, 74, 75 R, 87, 88, 89, 3/90.5, 91, 92, 96, 103, 109 R, 113, 153, 3/261.1, 268; 290/46; 403/335, 337; 74/572.2, 572.21
See application file for complete search history.

(56) References Cited

U.S. PATENT DOCUMENTS

| | | | | |
|---|---|---|---|---|
| 3,745,393 | A | * | 7/1973 | Spors ............................. 310/239 |
| 4,254,668 | A | * | 3/1981 | Kessinger et al. ........... 74/572.2 |
| 4,631,433 | A | * | 12/1986 | Stokes ............................ 310/89 |
| 4,704,555 | A | * | 11/1987 | Stokes .......................... 310/268 |
| 5,327,034 | A | * | 7/1994 | Couture et al. ............. 310/67 R |
| 5,418,412 | A | * | 5/1995 | Brucker ...................... 310/75 R |
| 5,509,837 | A | * | 4/1996 | Allbright et al. ............. 440/111 |
| 5,957,249 | A | * | 9/1999 | Yamazaki et al. ..... 188/218 XL |
| 6,561,336 | B1 | * | 5/2003 | Huart et al. ............. 192/70.252 |
| 7,037,226 | B2 | * | 5/2006 | Zulawski ........................ 474/19 |
| 7,472,768 | B2 | * | 1/2009 | Denner et al. ............... 180/65.1 |
| 2006/0238049 | A1 | * | 10/2006 | Heinzel .......................... 310/89 |

FOREIGN PATENT DOCUMENTS

| | | | | |
|---|---|---|---|---|
| CN | 101134305 A | | 3/2008 | |
| JP | 2001-112225 A | | 4/2001 | |
| KR | 20060044117 a | * | 5/2006 | ............... H02K 1/22 |

\* cited by examiner

ROTOR DEVICE OF INTEGRATED STATER-GENERATOR MOTOR AND ROTOR WORKING SYSTEM

TECHNICAL FIELD

The present invention relates to the field of vehicle manufacturing technologies, and more particularly, to a rotor device of an integrated starter-generator motor and a rotor working system.

BACKGROUND OF THE INVENTION

An integrated starter-generator (ISG) motor of a vehicle is directly integrated on a crankshaft of an engine. That is, in place of the conventional starter motor, a certain motor having a relatively large transient power is used directly to drive the vehicle in place of the engine in a short period at a starting stage, and meanwhile functions to start the engine to reduce the idle speed loss and pollution of the engine. During normal driving, the engine drives the vehicle, and the ISG motor is powered off or functions as a generator; during braking, the ISG motor can further have a regeneration function to recycle the braking energy to achieve the energy-saving effect. In short, this is an energy-saving, environmental friendly and low-cost solution which is intermediate between hybrid powered vehicles and conventional vehicles.

The ISG is directly integrated on the crankshaft of the engine. In consideration of environment protection and the strategy of the sustainable energy development, manufacturers all strive to research on and make use of the ISG technologies. The ISG involves the technologies such as motors, modern power electronics, digital signal processing and modern control, and combines together the starting and generating functions of conventional vehicles. Moreover, the ISG has prominent advantages such as rapid start/stop control, good performance in energy regeneration and recycling and enhanced power assistance, and is particularly advantageous in exhaust pollution reduction and saving fuel. Therefore, the ISG is internationally recognized as a goal to be necessarily achieved for engine components of conventional vehicles, the hybrid-powered vehicles and future electric vehicles.

As compared to the micro hybrid power system, the ISG system, in addition, is able to use the generator for start/stop control of the engine, which further absorbs a part of the energy during decelerating and braking; and during the process of driving, adjusting the output power of the engine between the driving requirement of the vehicle and the charging requirement of the generator so that the engine operates more within a high efficiency range to improve the overall efficiency.

Currently, there are mainly two kinds of structures for a rotor device of the ISG motor as follows.

(1) FIG. 1 is a schematic view illustrating a first type of rotor device structure of an ISG motor in the prior art. As shown in FIG. 1, the rotor device mainly consists of a shaft 101, a bearing 102, a rotor supporting frame 103, a bearing 104, and a clutch driving disc 105. The shaft 101, the rotor supporting frame 103 and the clutch driving disc 105 are fixed mechanically, and the entire rotor device is supported on a housing of the ISG motor by bearings.

(2) FIG. 2 is a schematic view illustrating a second type of the rotor device structure of the ISG motor in the prior art. As shown in FIG. 2, the rotor device mainly consists of a rotor supporting frame 201, a bearing 202, a bearing 203, and a clutch driving disc 204 which are fixed mechanically, and the entire rotor device is supported on a housing of the ISG motor by bearings.

FIG. 2 differs from FIG. 1 in that, the rotor supporting frame 201 in FIG. 2 is equivalent to both the shaft 101 and the rotor supporting frame 103 in FIG. 1.

As can be seen, the rotor devices of the conventional ISG motors all consist of multiple components which are fixed together mechanically (e.g., through bolt connection), and are all supported by means of at least one bearing. Consequently, the cumulative deviation of the system will be increased in the processing and manufacturing and the components assembling processes so that the entire system has poor stability and consistency.

BRIEF SUMMARY OF THE INVENTION

The present invention provides a rotor device of an integrated starter-generator (ISG) motor, and the rotor device replaces the conventional rotor device being comprised of a rotor supporting frame of a motor, an engine flywheel, a clutch driving disc and so on, which improves stability and consistency of the ISG system.

The present invention further provides a rotor working system of an ISG motor, and the rotor working system improves stability and consistency of the ISG system, reduces the weight and the cost of the motor and increases the production efficiency.

To achieve the aforesaid objectives, the technical solutions of the present invention are implemented as follows.

The present invention discloses a rotor device of an ISG motor, the rotor device that is monobloc cast and then machined to become an inseparable, one-piece structure.

the rotor device is in the form of a straw hat, wherein the rotor device having an external side surface of a hat top being the surface (11), an external side surface of a hat brim being the surface (13), an inner side surface of the hat brim being the surface (12), and a surface (14) which connects the surface (11) with the surface (13);

the surface (11) of the rotor device is formed with multiple through holes (1) for fixing with a crankshaft; and the surface (12) of the rotor device is formed with multiple threaded holes (2) for connection with a clutch, and the threaded holes (2) pass through the surface (13) corresponding to the surface (12).

Preferably, the surface (13) of the hat brim is provided with multiple bosses (3) each being formed with one threaded hole (2).

Preferably, multiple triangular ribs (4) are designed between the surface (13) and the surface (14).

Preferably, an extrusion platform (5) is made on the surface (11), and all the through holes (1) are formed on the extrusion platform (5).

Preferably, the surface (11), the surface (12) and the surface (13) are flat surfaces parallel to each other, and the surface (14) is a curved surface perpendicular to the surface (11) and the surface (12).

The present invention further discloses a rotor working system, the system comprising: an engine, a crankshaft connected to the engine, a rotor device connected to and rotates together with the crankshaft, a rotor iron core fixed on the rotor device, a clutch connected to the rotor device, and a gear box connected to the clutch, wherein:

the rotor device that is monobloc cast and then machined to become an inseparable, one-piece structure;

the rotor device is in the form of a straw hat, wherein the rotor device having external side surface of a hat top being the surface (11), an external side surface of a hat brim being the surface (13), an inner side surface of the hat brim being the surface (12), and a surface (14) which connects the surface (11) with the surface (13);

the surface (11) of the rotor device is formed with multiple through holes (1) for fixing with a crankshaft; and the surface (12) of the hat brim is formed with multiple threaded holes (2) for connection with a clutch, and the threaded holes (2) pass through the surface (13) corresponding to the surface (12).

Preferably, in the rotor device of the rotor working system, the surface (13) is provided with multiple bosses (3) each being formed with one threaded hole (2).

Preferably, on the rotor device of the rotor working system, multiple triangular ribs (4) are designed between the surface (13) and the surface (14).

Preferably, in the rotor device of the rotor working system, an extrusion platform (5) is made on the surface (11), and all the through holes (1) are formed on the extrusion platform (5).

Preferably, in the rotor device of the rotor working system, the surface (11), the surface (12) and the surface (13) are flat surfaces parallel to each other, and the surface (14) is a curved surface perpendicular to the surface (11) and the surface (12).

As described above, the rotor device of the present invention is a monobloc cast and then machined, inseparable one-piece structure, the surface (11) of the rotor device is formed with multiple through holes (1) for fixing with a crankshaft, the surface (12) of the rotor device is formed with multiple threaded holes (2) for connection with a clutch, and the threaded holes (2) pass through the surface (13) corresponding to the surface (12). Thereby, stability and consistency of the ISG system are improved.

DETAILED DESCRIPTION OF THE INVENTION

In the present invention, the conventional solution of constituting a fabricated rotor device by multiple components such as a shaft, a rotor supporting frame, a clutch driving disc and an engine flywheel is abandoned and instead, an integrated rotor device is provided. This can not only save the space of the ISG and reduce the weight of the ISG, but can also improve stability and consistency of the entire ISG system.

To make the objectives, the technical solutions and the advantages of the present invention clearer, the present invention will be described in detail with reference to the attached drawings and embodiments thereof hereinafter.

Figure 1:
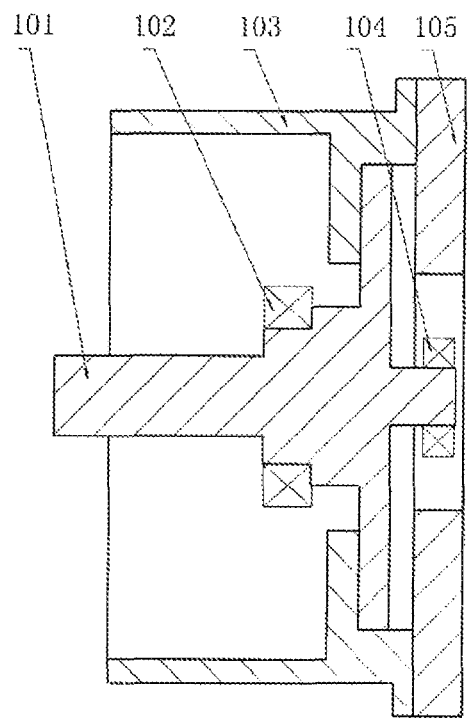
FIG. 1 is a schematic view illustrating a first type of a rotor device structure of an ISG motor in the prior art.
Figure 2:
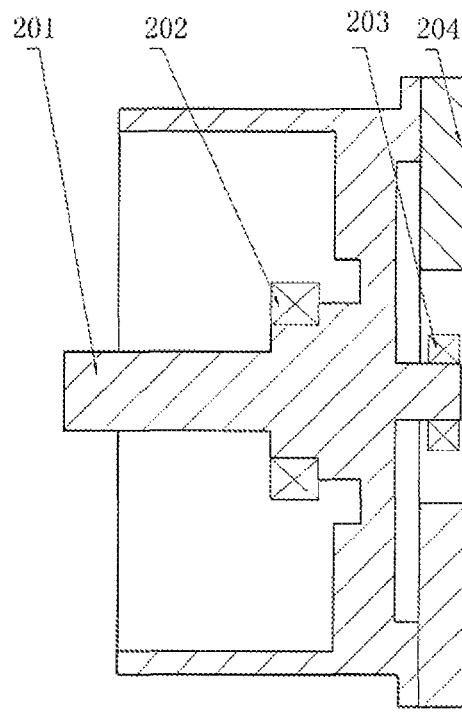
FIG. 2 is a schematic view illustrating a second type of the rotor device structure of the ISG motor in the prior art.
Figure 3:
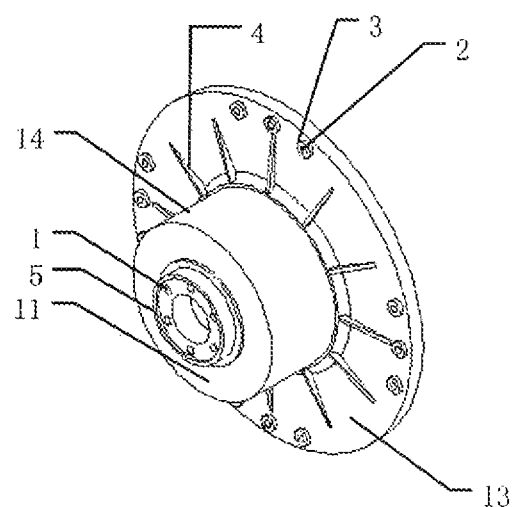
FIG. 3 is a first perspective view illustrating a rotor device of an ISG motor according to an embodiment of the present invention.
Figure 4:
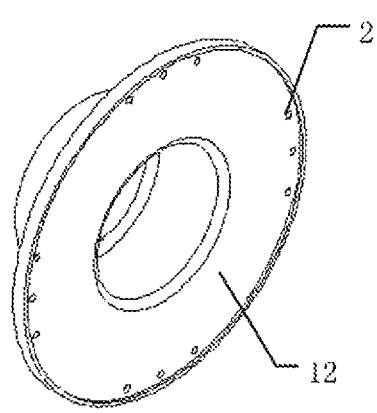
FIG. 4 is a second perspective view illustrating the rotor device of the ISG motor according to the embodiment of the present invention.
Figure 5:
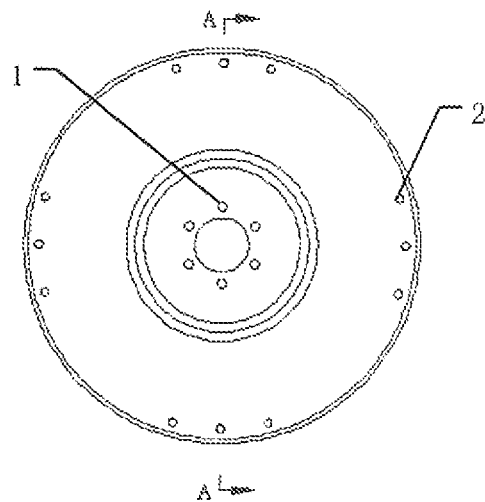
FIG. 5 is a right view illustrating the rotor device of the ISG motor according to the embodiment of the present invention.
Figure 6:
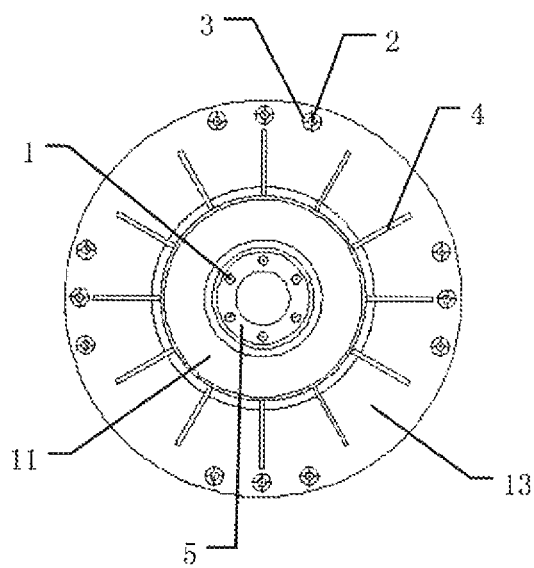
FIG. 6 is a left view illustrating the rotor device of the ISG motor according to the embodiment of the present invention.
Figure 7:
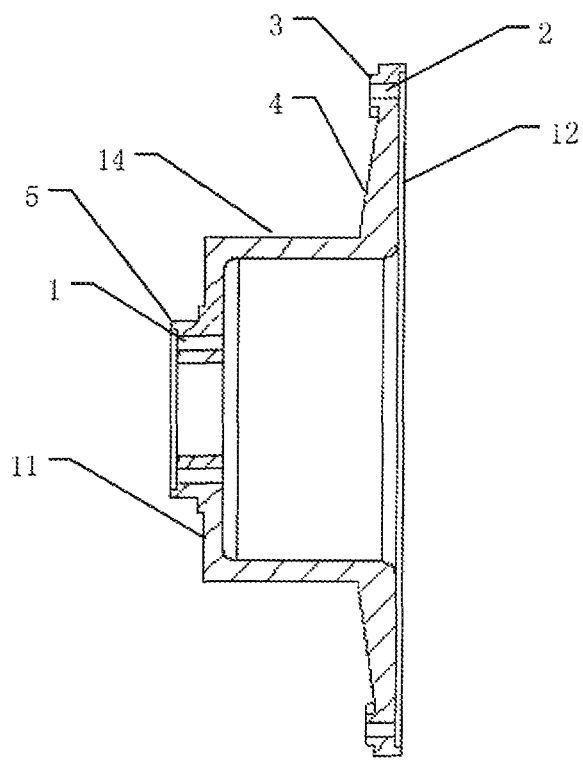
FIG. 7 is a cross-sectional view, taken along the line AA, of the rotor device of the ISG motor according to the embodiment of the present invention.

FIG. 3 is a first perspective view illustrating a rotor device of an ISG motor according to an embodiment of the present invention. FIG. 4 is a second perspective view illustrating the rotor device of the ISG motor according to the embodiment of the present invention. FIG. 5 is a right view illustrating the rotor device of the ISG motor according to the embodiment of the present invention. FIG. 6 is a left view illustrating the rotor device of the ISG motor according to the embodiment of the present invention. FIG. 7 is a cross-sectional view, taken along the line AA, of the rotor device of the ISG motor according to the embodiment of the present invention.

Referring to FIG. 3 to FIG. 7, the rotor device of the present invention is a monobloc cast and then machined, inseparable one-piece structure, and the rotor device is in the form of a straw hat. For convenience of description, the numerals are designated as follows: an external side surface of a hat top is designated as a surface 11, an external side surface of a hat brim is designated as a surface 13, an inner side surface of the hat brim is designated as a surface 12, and a surface connecting the surface 11 with the surface 13 is designated as a surface 14. Of course, the rotor device further comprises an inner side surface of the hat top and an inner side surface corresponding to the surface 14 (i.e., a surface connecting the inner side surface of the hat top with the inner side surface 12 of the hat brim), which are not designated herein. The surface 11 is a circular surface; the surface 12 and the surface 13 are annular flat surfaces; the surface 11, the surface 12 and the surface 13 are flat surfaces parallel to each other; and the surface 14 is an annular curved surface, which connects an edge of the surface 11 with an inner annular edge of the surface 12 and is perpendicular to the surface 11 and the surface 12.

Referring to FIG. 3 to FIG. 7, the surface 11 of the rotor device is formed with multiple through holes 1 (in this embodiment, six through holes 1) for fixing with a crankshaft. The surface 12 of the rotor device is formed with multiple threaded holes 2 (in this embodiment, twelve threaded holes) for connection with a clutch, and the threaded holes 2 pass through the surface 13 corresponding to the surface 12.

Referring to FIG. 3 to FIG. 7, in this embodiment, the surface 13 is provided with multiple bosses 3 each being formed with one threaded hole 2. This kind of boss design can increase the depth of the threaded holes 2 so that the robustness can be enhanced when fixation is made using bolts. Likewise, in this embodiment of the present invention, an extrusion platform 5 is designed on the surface 11, and all the through holes 1 are formed on the extrusion platform 5. This kind of design is also mainly for the purpose of increasing the depth of the through holes 1 to enhance the robustness of connection with the crankshaft.

Referring to FIG. 3, FIG. 6 and FIG. 7, multiple triangular ribs 4 (in the rotor device of this embodiment, twelve ribs in all) are designed between the surface 13 and the surface 14 of the rotor device of the present invention. Functions of the ribs 4 are to reinforce the gripping between the surface 13 and the surface 14 of the rotor device and meanwhile strengthen the impact resistance of a panel connecting the rotor device with the clutch (i.e., a panel relating to the surfaces 12 and 13).

The special construction design of the extrusion platform and the ribs described above reinforces the panel connecting the rotor device with the clutch. Therefore, the panel, of the rotor device, connecting with the clutch can be designed to be somewhat thinner; i.e., the distance between the surface 12 and the surface 13 can be reduced somewhat. This effectively reduces the weight of the rotor device. Likewise, the extrusion platform design on the surface 11 can also achieve the purpose of weight reduction. Moreover, the entire integrally designed rotor device provided in the present invention only needs to be machined once and eliminates the need of using bearings as compared to the prior art, and this can significantly reduce the processing and assembling procedures and thus increase the production efficiency.

Using the one-piece designed rotor device of the present invention can also eliminate the need of the engine flywheel; i.e., the moment of inertia is provided by the rotor device. However, the conventional fabricated rotor device needs a separate engine flywheel to provide the moment of inertia.

Figure 8:
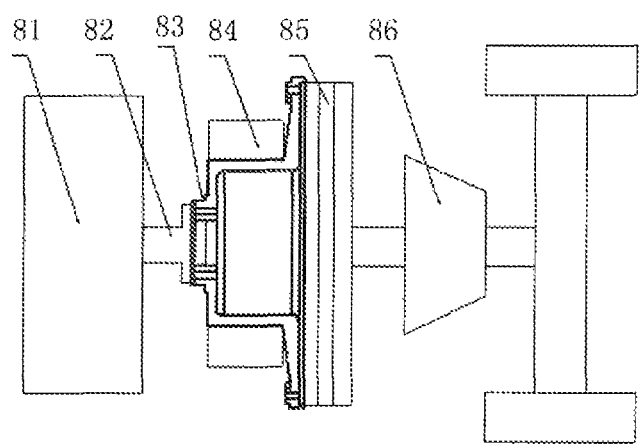
FIG. 8 is a schematic view illustrating a rotor working system according to an embodiment of the present invention.

FIG. 8 is a schematic view illustrating a rotor working system according to an embodiment of the present invention. As shown in FIG. 8, the rotor working system of the vehicle comprises: an engine 81, a crankshaft 82 connected to the engine, a rotor device 83 connected to and rotates together with the crankshaft, a rotor iron core 84 fixed on the rotor device 83, a clutch 85 connected to the rotor device 83, and a gear box 86 connected to the clutch. The rotor device 83 of this system is the aforesaid rotor device shown in FIG. 3 to FIG. 7. In this system, the rotor device 83 and the crankshaft 82 are directly connected and rotate together, and the rotor device 83 is supported by the crankshaft 82, avoiding using bearings to support. The rotor iron core 84 is fixed on the rotor device 83 and, meanwhile, the rotor device 83 and the clutch 85 are connected together. Engagement or disengagement occurs depending on different conditions.

According to the above descriptions, the rotor device of the present invention has the following advantages.

1. The rotor device is integrally designed and has multiple functions integrated together, and this not only saves the space but also improves stability and consistency. The entire rotor device adopts the integral design instead of the conventional shaft, rotor supporting frame, clutch driving disc and engine flywheel. This can not only reduce the number of components but can also avoid connection and arrangement among multiple components so that the stability and the consistency of the system are improved significantly.

2. The rotor device adopts the special structural design, which can reduce the weight. The reinforcing ribs and localized bosses are adopted on one side of the rotor device, connected to the clutch, which can reduce the thickness of the driving disc, of the rotor device, connecting to the clutch, thereby reducing the weight of the rotor device. Likewise, the extrusion platform design on the connecting disc, of the rotor device, connecting to the crankshaft also reduces the thickness of the connecting disc and reduces the weight of the rotor device.

3. The processing and assembling procedures are reduced, and the production efficiency is increased. The entire rotor device with the integral design only needs to be machined once, and this eliminates the need of processing multiple components respectively and then assembling the components to each other. Meanwhile, the rotor device is supported by the crankshaft directly, and this eliminates the need of using bearings and also avoids fine machining of bearing seats. Therefore, the manufacturing procedures such as the processing and assembling procedures are reduced significantly and the production efficiency is increased, and the present invention is suitable for batch production.

What has been described above is only preferred embodiments of the present invention but is not intended to limit the scope of the present invention. Any modifications, equivalent replacements and improvements made within the spirits and the principles of the present invention shall all fall within the scope of the present invention.

The invention claimed is:

1. A rotor device of an integrated starter-generator (ISG) motor, wherein:
   the rotor device is monobloc cast machined to become an inseparable, one-piece structure;
   the rotor device having a central portion and a brim projecting radially therefrom, wherein the rotor device has an external side surface on a top of the central portion being a first surface, an external side surface of the brim being a second surface, an inner side surface of the brim being a third surface, and a fourth surface which connects the first surface with the second surface;
   the first surface of the rotor device is formed with multiple through holes for fixing with a crankshaft;
   the third surface of the rotor device is formed with multiple threaded holes for connection with a clutch, and the threaded holes pass through the second surface corresponding to the third surface; wherein the second surface is provided with multiple bosses, each boss being associated with a corresponding threaded hole;
   multiple triangular ribs are between the second surface and the fourth surface; and
   an extruded platform is provided on the first surface, and all the through holes are formed on the extruded platform, the shape of the extruded platform is a ring.

2. The rotor device of claim 1, wherein:
   the first surface, the third surface, and the second surface are flat surfaces parallel to each other, and the fourth surface is a curved surface perpendicular to the first surface and the third surface.

3. A rotor system, the system comprising: an engine, a crankshaft connected to the engine, a rotor device connected to and rotates together with the crankshaft, a rotor iron core fixed on the rotor device, a clutch connected to the rotor device, and a gear box connected to the clutch;
   wherein;
   the rotor device is a monobloc cast machined to become an inseparable, one-piece structure;
   the rotor device having a central portion and a brim projecting radially therefrom, wherein the rotor device has an external side surface of a top of the central portion being a first surface, an external side surface of the brim being a second surface, an inner side surface of the brim being a third surface, and a fourth surface which connects the first surface with the second surface;
   the first surface of the rotor device is formed with multiple through holes for fixing with a crankshaft;
   the third surface of the rotor device is formed with multiple threaded holes for connection with a clutch, and the threaded holes pass through the second surface corresponding to the third surface; wherein the second surface is provided with multiple bosses, each boss being associated with a corresponding threaded hole;

multiple triangular ribs are provided between the second surface and the fourth surface; and an extruded extrusion platform is provided on the first surface, and all the through holes are formed on the extruded extrusion platform, the shape of the extruded extrusion platform is a ring.

4. The rotor system of claim 3, wherein:

the first surface, the third surface and the second surface are flat surfaces parallel to each other, and the fourth surface is a curved surface perpendicular to the first surface and the third surface.

5. A rotor device of an integrated starter-generator (ISG) motor, comprising:

an inseparable, one-piece structure casted as a monobloc cast and then machined, the structure including:

an external first side surface lying in a first plane;

a brim portion defined by:

an external second side surface lying in a second plane spaced from and generally parallel to the first plane; and an inner side surface lying in a third plane spaced from and generally parallel to the second plane;

a generally arcuate surface extending between the first side surface and the second side surface;

wherein:

the first side surface of the structure is formed with multiple through holes for fixing with a crankshaft;

the second side surface of the structure is formed with multiple threaded holes for connection with a clutch, the threaded holes passing through to the inner side surface; wherein the second surface is provided with multiple bosses, each boss being associated with a corresponding threaded hole;

multiple triangular ribs provided between the second side surface and the arcuate surface; and an extruded platform is provided on the first side surface, and all the through holes are formed on the extruded platform, the shape the extruded platform is a ring.

6. The rotor device of claim 5, wherein:

the first side surface, the second side surface, and the inner side surface are generally flat, and the arcuate surface is curved and extends along an axis perpendicular to the first side surface and the second side surface.

* * * * *